United States Patent [19]
Broadbent, II

[11] Patent Number: 5,917,256
[45] Date of Patent: Jun. 29, 1999

[54] TIMING DEVICE FOR BLOCKING TELEVISION SIGNALS

[76] Inventor: Frederick J. Broadbent, II, 35 N. First St., Bangor, Pa. 18013

[21] Appl. No.: 09/015,958

[22] Filed: Jan. 30, 1998

Related U.S. Application Data

[60] Provisional application No. 60/036,852, Feb. 4, 1997.

[51] Int. Cl.[6] .................................................. H04M 7/167
[52] U.S. Cl. ........................ 307/141; 307/139; 348/725; 200/43.08; 200/43.11
[58] Field of Search ..................................... 307/141, 139; 968/813, 975, 976; 200/33 R, 43.08, 43.11; 348/725, 730

[56] References Cited

U.S. PATENT DOCUMENTS

| | | |
|---|---|---|
| 3,833,779 | 9/1974 | Leone ......................................... 307/14 |
| 4,384,696 | 5/1983 | Beier . |
| 4,566,033 | 1/1986 | Reidenouer ........................... 200/33 R |
| 4,588,901 | 5/1986 | Maclay et al. ........................... 968/976 |
| 5,051,837 | 9/1991 | McJunkin . |
| 5,191,231 | 3/1993 | Berry . |
| 5,231,661 | 7/1993 | Harnum et al. .............................. 380/7 |
| 5,250,767 | 10/1993 | Sammon . |
| 5,382,983 | 1/1995 | Kwoh et al. . |
| 5,465,113 | 11/1995 | Gilboy . |
| 5,537,612 | 7/1996 | Cherrick et al. . |
| 5,548,345 | 8/1996 | Brian et al. . |

FOREIGN PATENT DOCUMENTS

55-52683  4/1980  Japan .

*Primary Examiner*—Albert W. Paladini
*Attorney, Agent, or Firm*—Richard C. Litman

[57] ABSTRACT

A timing device for television that controls television viewing by interrupting the input signal, or input signals, to a remote television during a predetermined time or times of day. A user selects and manually presets the timer to automatically close or open an internal switch that alternately connects and interrupts transmission of an input signal, or input signals, to a remote television.

15 Claims, 4 Drawing Sheets

TIMING DEVICE FOR BLOCKING TELEVISION SIGNALS

CROSS-REFERENCE TO RELATED APPLICATION

This application claims the benefit of U.S. Provisional Patent Application Serial No. 60/036,852, filed Feb. 4, 1997.

BACKGROUND OF THE INVENTION

1. Field of The Invention

The present invention relates generally to television access control devices and particularly to devices that permit parental control over the viewing of television by children.

2. Description of Prior Art

Sociological and psychological studies of adolescent development confirm that excessive television viewing by children is causally related to numerous negative or antisocial behavioral and personality traits, such as passivity, aggression or violence, and a lack of discipline. Some studies support that excessive television viewing by children is causally related to a reduction in their educational levels; others suggest that excessive viewing causes children to imitate violence seen on television. Additionally, many television programs broadcast late at night are not considered suitable for immature viewers. As a result of these and other such problems, there is a need for a device that limits or controls the access that children have to television viewing.

The onset of a negative behavioral or educational effect caused by television viewing is not measured in terms of minutes, rather in terms of hundreds of hours. A device precisely controlling viewing to the minute is unnecessary to counteract the negative effects of excessive television viewing by children. Various devices that limit or control the amount of time a television may be viewed are known; but children are clever and have often found ways to defeat parental control of television viewing.

For example, in devices where the connections are exposed, children have used unfolded paper clips to circumvent the intended control limits. Also, in devices that control the time of day viewing is permitted, children can delay the actual viewing time by unplugging the timing device and temporarily interrupting power to the clock. Thus, there is a need for a timing device for controlling television viewing that has hidden connections which cannot be accessed by children.

Another problem with many of the timing devices currently known is that they are too complicated, and not user friendly. In an age when it is common to hear a complaint regarding the difficulty of programming a video cassette recorder, a need exists for a timing device for television that is simple to operate, i.e. a timing device that is user friendly.

Moreover, an adult who exercises control over television viewing of a child generally does not want to be subject to the same viewing limitations placed upon that child. Thus, customarily that adult is then burdened to complete numerous programming steps in technologically complicated prior art in order to view television programming at will. Therefore, a timing device to limit television viewing that contains simple, easy to understand and operate features that permits an adult to view television programming at will is desired.

Moreover, a familiar hassle present in some known timing devices is the large number of reprogramming steps necessary to make a system operational again after a power outage. Such a reprogramming problem also arises in timing devices that have an exposed power connection, when, as explained above, clever children selectively unplug an exposed power connection to a timing device for a television. Thus, a need exists for a timing device that can be reprogrammed in one simple step.

Other loopholes of complicated technology in timing devices for television have been exploited. For example, when multiple children join together to watch television controlled by a device that assigns passwords and viewing time limits to each child, each child can enter his or her password consecutively to extend the viewing time as a group beyond the predetermined time limit of each child individually.

Another need exists for a timing device that draws and distributes electrical power more evenly. Timing devices for controlling television viewing typically contain an electrical receptacle into which the power cord from a television, video cassette recorder, cable box, or other components is plugged. The cumulative power drain of multiple electrical components increases the risk of a blown fuse or electrical fire due to overload when the timing device draws its power from a single electrical outlet.

Furthermore, many timing devices to limit television viewing are loosely connected to the television support, which causes difficulty in making an input or output signal cable or power cord connection. A secure and stable timing device would increase the ease with which a cable connection or power line is connected or disconnected.

The following patents describe television viewing control devices having the above discussed limitations. A first group of patents describe devices that interrupt the input power to a television as a means of controlling use of the television. U.S. Pat. No. 4,348,696, issued to Galen C. Beier on Sep. 7, 1982, shows a television viewing control device that records the viewing time of one or more viewers watching a controlled television set and turns off the set when a predetermined viewing time of any one of the viewers is exceeded. U.S. Pat. No. 5,051,837, issued to Thomas N. Mcjunkin on Sep. 24, 1991, shows a home entertainment equipment control apparatus that limits user access and operation time of home entertainment equipment. U.S. Pat. No. 5,191,231, issued to Woodrow Berry on Mar. 2, 1993, shows a timer for electrical appliances that programs pre-set periods during which an electrical appliance can be operated.

Unlike the above devices, U.S. Pat. No. 5,250,767, issued to Michael D. Sammon on Oct. 5, 1993, shows a television receiver signal blocking system that allows a user to manually block a television signal with a key, causing an interruption of the input signal, rather than the input power, as a means of controlling use of the television.

Other patented inventions utilize microprocessor technology to achieve sophisticated control of television viewing. U.S. Pat. No. 5,382,983, issued to Daniel S. Kwoh et al. on Jan. 17, 1995, shows an apparatus and method for parental control of television access that uses a microprocessor for monitoring and control of television use. U.S. Pat. No. 5,465,113, issued to Christopher P. Gilboy on Nov. 7, 1995, shows a programmable, channel-regulating, cable-television controller that limits the amount of time a viewer may watch television. U.S. Pat. No. 5,548,345, issued to Brian et al. on Aug. 20, 1996, shows a censoring system that enables a supervisor to selectively program the hours, channels, and programs that may be viewed on a video cassette recorder, cable television, or satellite television.

Other patents show devices which perform related functions. U.S. Pat. No. 5,537,612, issued to Sol M. Cherrick et al. on Jul. 16, 1996, shows a remotely selectable audio/ video/text disruption system that disables use of an audio-visual electronic product from a remote location. Japanese published Patent Number 55-52683, by Akira Miyagawa, published on Apr. 17, 1980, shows a control system for video programming that interrupts the transmission of video programming to a television receiver.

None of the above described inventions show a timing device for controlling cable television viewing which employs a double plug for plugging into both outlets of a standard electrical receptacle, that has securing means for the cover plate of the standard electrical receptacle, that has recessed or hidden input signal connections, which includes a locking hinged cover, with an overall configuration that maintains uninterrupted power to all connected electrical components, draws and distributes electrical power more evenly, prevents tampering by a child, permits an adult to view television programming at will, provides a firm, stable support increasing the ease with which a cable connection or power line is connected or disconnected, and increases the ease and simplicity of standard operation and programming. Likewise, none of the above inventions and patents, taken either singularly or in combination, is seen to describe the instant invention as claimed. Thus a timing device for television solving the aforementioned problems is desired.

SUMMARY OF THE INVENTION

The present invention is a timing device to limit television viewing by interrupting the input signal or signals to a television during a predetermined time or times of day. A user selects and manually presets the timer to automatically close and open an internal switch that connects and interrupts, respectively, transmission of an input signal to a remote television.

Accordingly, it is a principal object of the invention to provide a device which permits an adult to automatically limit the amount of time a viewer can spend watching television without actively monitoring the viewer and television.

It is another object of the invention to reduce the level of technical or electronic aptitude necessary to properly program, reprogram, or operate the timer device for controlling television viewing.

It is a further object of the invention to interrupt a television input signal without interrupting input power to the television, video cassette recorder, or other related electrical components.

Still another object of the invention is to design a timing device for controlling television viewing that contains simple, easy to understand and operate features that enables an adult to view television programming at will.

Further, it is an object of the invention to minimize the amount and complexity of reprogramming steps necessary to restore a timing device for controlling television viewing to operational status after a power outage has occurred.

It is also an object of the invention to eliminate known or foreseen possibilities for tampering by children by reducing the amount of access children have to electrical and input signal connections.

Another object of the invention is to reduce the risk of overload by drawing and evenly distributing electrical input power from more than one electrical outlet.

It is an object of the invention to provide improved elements and arrangements in a timing device to limit television viewing for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to timers that control the amount of time a child can spend watching television. The invention is referred to herein as a timing device to limit television viewing, or simply as a timer 10. For the purpose of promoting an understanding of the principles of the invention, a preferred embodiment of the timer 10 is described below.

Figure 1:
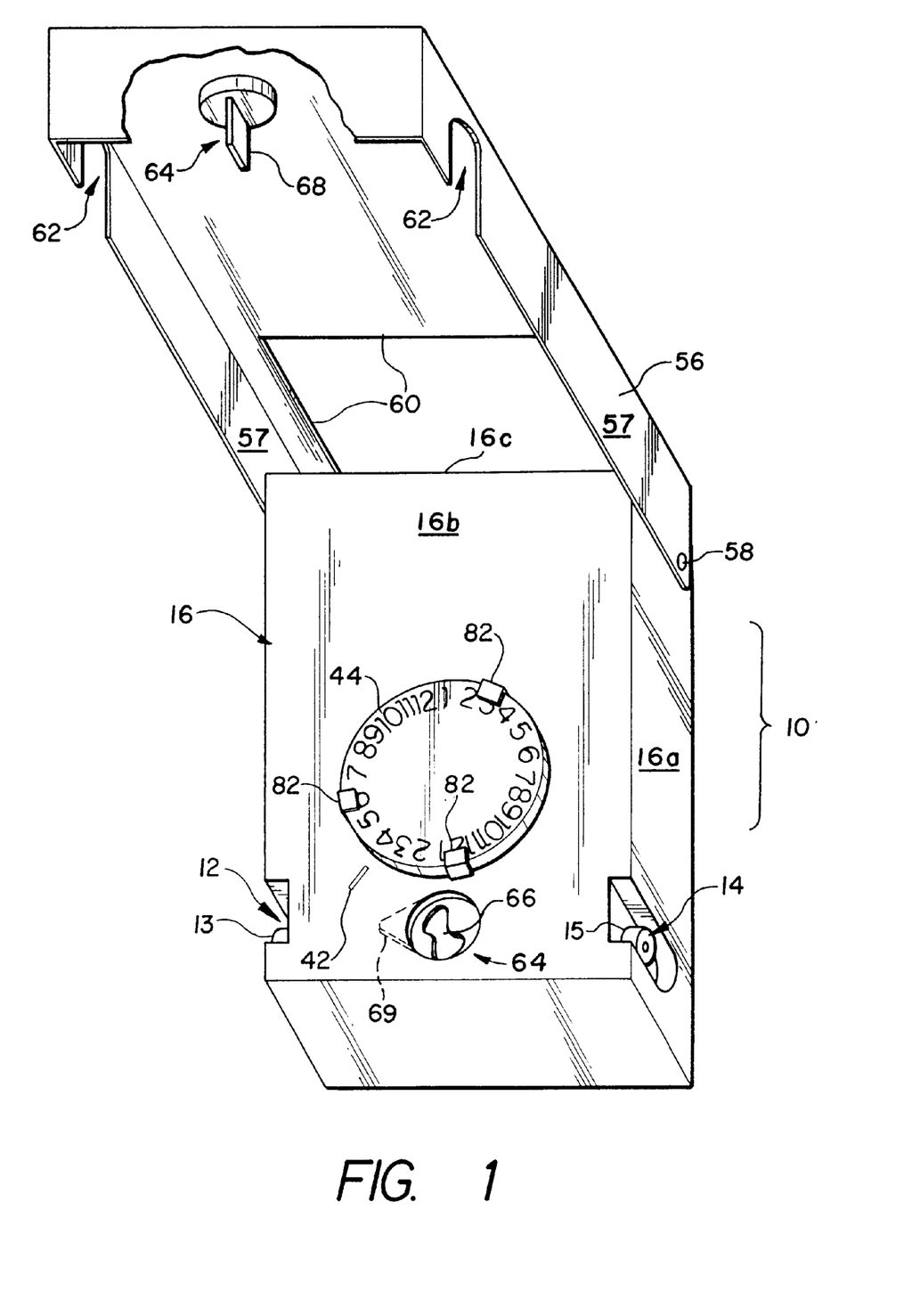
FIG. 1 is a bottom front perspective view of a timing device for television, according to the present invention, with the hinged cover partially fragmented and in the open position.
Figure 2:
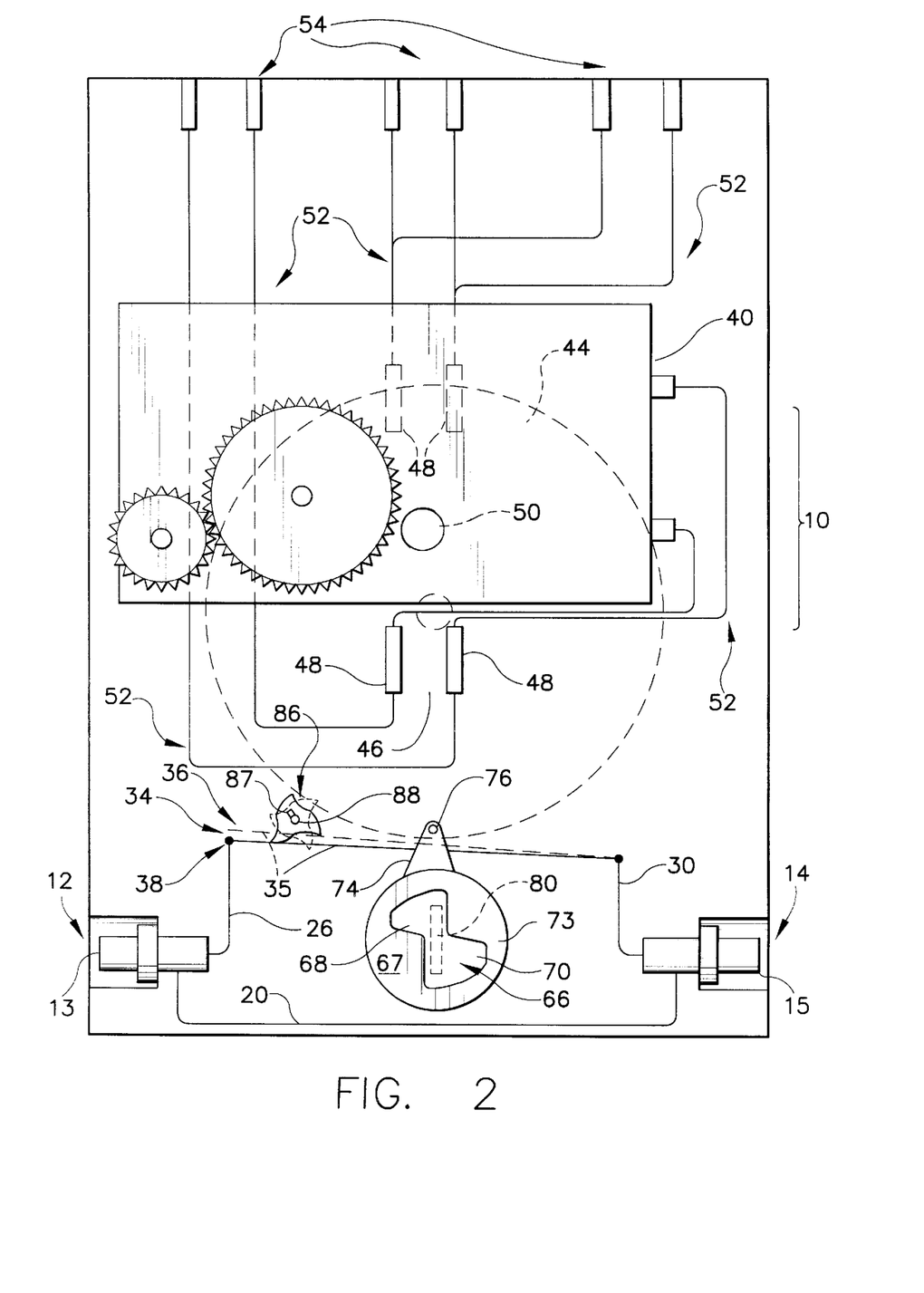
FIG. 2 is a front elevation view of the device of FIG. 1 without the hinged cover and diagrammatically showing interior construction.

The invention operates essentially as an on and off switch for the input signal to a television set. Referring to FIG. 2, a timer 10 is shown having one signal input 12 and one signal output 14. The signal output 14 of the timer 10 becomes the input signal to the remote television (not shown). The timer 10 has a housing 16, as shown in FIG. 1, in which the various components, as shown in FIG. 2 in layers, are contained.

Many forms of input signals 12 to televisions have become known. Some common examples of input signals 12 to a television are a cable television line, a cable decoder or translator box, a video cassette recorder, a satellite receiver, a computer monitor output (especially popular when playing computer games), and a common antenna. Although the present invention is easily adaptable to each of the noted forms of input signals, the preferred embodiment is shown having a female connector for a coaxial cable plug to receive a cable signal. Plugs or connectors are common to cable television lines, television antennas, and other forms of television input signals. The coaxial cable plug may be replaced as needed with any other type of connector used for a television input signal. Although the pictured embodiment only shows one signal input 12 and one signal output 14, the spirit of the invention includes other embodiments that operate on more than one signal input 12 and more than one signal output 14.

Within the housing 16 as shown in FIG. 2, a ground wire 20 connects the ground terminal of the signal input connector 13 to the ground terminal of the signal output connector 15. An input signal wire 26 connects the signal terminal of the signal input connector 13 to a switch 34. Likewise, an output signal wire 30 connects the signal terminal of the signal output connector 32 to the other terminal of the switch 34. The input signal wire 26 and the output signal wire 30 attach to the two sides of a shunt arm 35 that forms a mechanical, normally-open switch 34. When no downward force is applied to the shunt arm 35, the switch 34 stays in the open position 36, as shown by the dashed line in FIG. 2. When the switch 34 is in the open position 36, the signal input 12 to the timer 10 is not transmitted from the input signal wire 26 to the output signal wire 30 and the input signal intended for the remote television is interrupted. Thus, the circuit is open between the input signal connector 13 and the signal output connector 15 when the shunt arm 35 is in the open position 36.

The shunt arm 35 is shown in FIG. 2 in a closed position 38 as a solid line between the input signal wire 26 and output signal wire 30 to form a closed circuit. To form the closed circuit, a trip cam 86 is turned and the shunt arm 35 is forced down to make contact with the input signal wire 26. The shunt arm 35 remains in a down or closed position 38 and maintains a closed circuit until the trip cam 86 is turned again. Placing the switch 34 in the closed position 38 enables the input signal to pass to the remote television, thus, the circuit is closed. Different embodiments of switches which would selectively connect and interrupt an input signal to a remote television when the switch 34 is in the open position 36 and the closed position 38 can be used in accordance with intended function of the switch 34. In other embodiments, the switch 34 may be a common micro-switch or a solenoid switch.

The preferred embodiment shown in the Figures contains a clock 40 which has a clock face 44 that rotates to turn the trip cam 86, similar to those conventionally used with outlet-mounted, mechanical, security houselight timers. The trip cam 86, which is located inside the housing 16, is controlled by manually setting a set pin 82 located on the edge of the clock face 44, which pin 82 passes through to the outside of the housing 16. Once set the set pin 82 is securely attached to the clock face 44 so that the set pin 82 revolves with the clock face. The set pin 82 thus extends from the clock face 44 into the housing 16 far enough so that the set pin 82 is allowed to engage the trip cam 86, and contacts the trip cam 86 during the course of the its revolution. When the clock face 44 rotates to correctly indicate the time, the set pin 82 engages the trip cam 86 and the trip cam 86 is forced to rotate about its axle. Rotation of the trip cam 86 causes it to alternately engage and disengage the shunt arm 35, as the set pin 82 is engages and releases, respectively, the trip cam 68.

Indicia for setting the current time are provided on the outside housing 16, namely time reference point 42, and clock face 44, namely the numeric indicia of the clock face 44 as divided into time intervals. The intervals may be conveniently divided into one or ½ hour intervals to correspond with most television programming. The time reference point 42 on the outside of the housing corresponds in position to that of the trip cam 86 within the housing. Thus, after a user determines the correct current time, the reference point 42 allows the user to rotate the clock face 44 to align the proper numeric indicia or position therebetween with the reference point 42 to reflect the correct time. As a result, the set points of the set pins 82, as previously or subsequently set, correspond with a future time and are aligned in proper sequence for tripping the trip cam 86 at that time.

As can be now understood, the reference point 42 is simply to enable the timer 10 to set and indicate the correct time to a user as the clock 44 counts time, and should be positioned over the cam because the clockface and relative set points thereon indicate the present condition of the cam by virtue of their mechanical and spacial relationships to the cam. Therefore, if the clock face 44 of the timer 10 corresponds to an incorrect time, the clock face 44 simply has to be rotated so that the reference point 42 is next to the correct number or position displayed on the clock face 44, similar to moving a hand of a clock. For example, in FIG. 1 the reference point 42 is opposite a "4" and this means that it is 4:00 PM. Other types of indicators, including a digital indicator with an LED display, could also be used in this invention. An embodiment using a digital timer may have multiple function settings as known in the prior art for programming on and off set times.

The preferred embodiment of the clock face 44 is labeled with a 24-hour dial that distinguishes the morning hours from the evening hours. A user chooses a time to trigger the switch 34 by attaching a set pin 82 to the clock face 44 adjacent to a time label on the clock face 44 that corresponds to the time of day when the user wants the switch 34 to be triggered. A second set pin 82 attaches to the clock face 44 adjacent to a time label on the clock face 44 that corresponds to the time of day when the user wants the switch 34 to be triggered again, for example to interrupt the signal to a television and terminate viewing. In an alternative embodiment, the set pin 82 is slidably attached to the clock face 44 so that a time is chosen by sliding the set pin 82 along the exterior edge of the clock face 84 to a desired time. In either embodiment, when installed on the clock face 44, the set pin 82 passes through a gap in the housing to its interior.

Referring to FIG. 2, when the clock face 44 rotates, the set pin 82 rotates therewith and eventually reaches a position on the path of rotation which causes the pin 82 to engage the trip cam 86, which then in turn rotates about its axis or shaft 88 as the pin passes. The trip cam 86 engages the switch 34, in turn operating the circuit to the output signal wire 30. When the trip cam 86 first engages the switch 34, the trip cam 86 causes the switch 34 to toggle to the closed position 38, thus connecting the input signal to the remote television. The switch 34 remains in the closed position 38 until another set pin 82 turns the trip cam 86 again. When the trip cam 86 turns again, the output signal wire 30 disengages and causes the switch 34 to toggle to the open position 36 (each component shown in phantom lines), thus interrupting the input signal to the remote television.

The trip cam 86 is mounted on a fixed shaft 88. The shaft 88 serves as the axis around which the trip cam 86 rotates when the trip cam 86 engages and disengages the switch 34. Attached to the shaft is a stop means 87 (diagrammatically shown). The stop means on the shaft 88 prevents the trip cam 86 from rotating beyond a position which engages or disengages the output signal wire 30 until the trip cam 86 is rotated again. Such stop means may be chosen from those commonly known in the art.

The clock 40, the reference point 42, and the other electrical or electronic elements in the invention draw power for operation from a common household electrical outlet or receptacle. The timer 10 connects directly to a common electrical outlet with mating electrical plugs 48. A screw hole 50 in the rear wall of the housing 16 is positioned between the plugs 48 so that when the plugs 48 are inserted into an ordinary electrical receptacle, not shown, the hole 50 aligns with a receiving hole in the face plate of the electrical outlet. The screw hole 50 so aligned allows passage of a screw which may be tightened against the inside back of the housing 16 to secure the timer 10 to the outlet.

The preferred embodiment draws power from both sets of electrical plugs 48 from an ordinary electrical receptacle. The timer 10 distributes electrical power via internal electrical circuitry 52 (FIG. 2) to the clock 40 and to appliance outlets 54. In the preferred embodiment, a television, a video cassette recorder, or another related appliance may draw power from the appliance outlets 54. The internal electrical circuitry 52 is not affected by the operation of the switch 34. In other words, as long as a main power source is supplied to the timer 10, power is always supplied to the internal electrical circuitry 52 and the appliance outlets 54 are energized.

Figure 3:
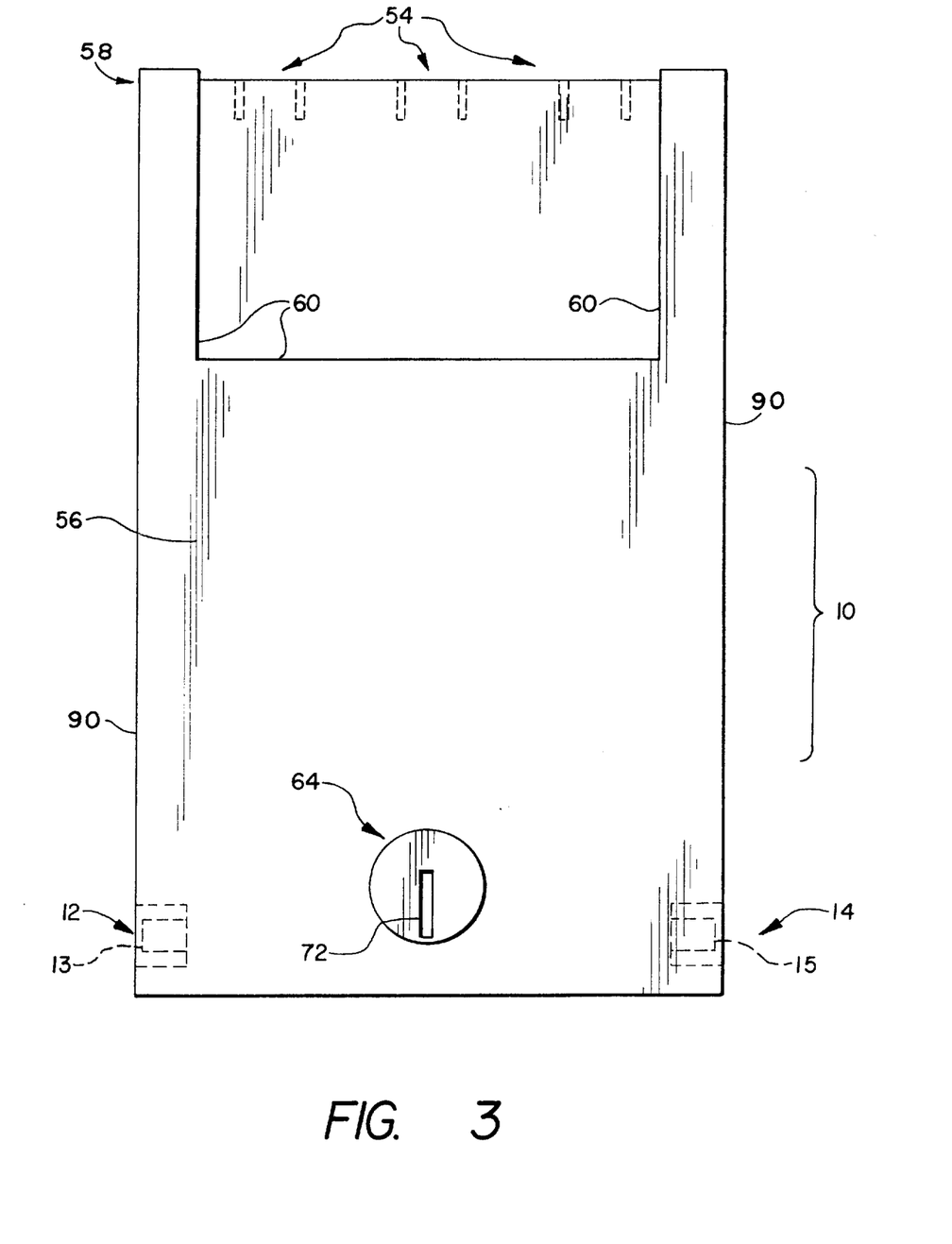
FIG. 3 is a front elevation view of the device with the hinged cover closed, the cover slightly modified.
Figure 4:
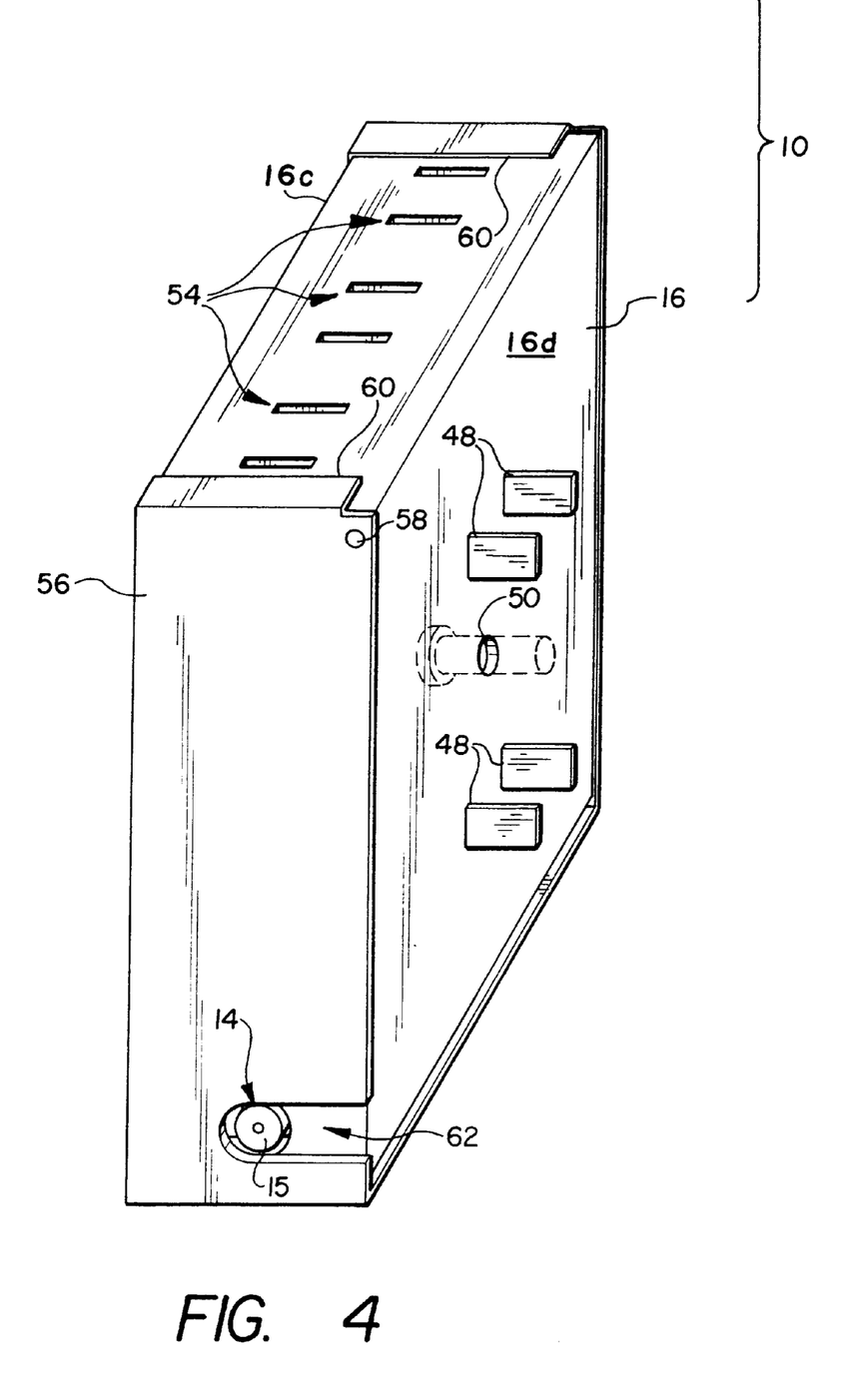
FIG. 4 is a top rear perspective view of the device of FIG. 1 with the hinged cover closed.

Referring to FIG. 1, a hinged cover 56 of the timer is shown open. The hinged cover 56 is pivotally connected to the housing 16 by hinges or trunnions 58 and serves as an anti-tampering device by covering clock face 44. The hinged cover 56 has inner edges 60 that define a cut-out portion in the cover 56. In FIG. 3, the inner edges 60 are positioned medial to the sides 16a of housing 16 because the position of the hinge 58 and the resulting pivot point is rearward of the housing 16. In FIG. 1, the cover 56 is hinged by trunnions 58 depending from sides 16a, wherein edges 60 are proximate sides 16a and define arms 57, each arm 57 engaging a trunnion 58, which requires that each arm be of sufficient length to permit the cover overlying the front face 16b of the housing 16 to clear the rear edge 16c of the housing.

Regardless of the version of the cover used, the cut-out portion is desirable because, when the cover is opened, the cut-out prevents interference of the cover 56 with power cords connected to the appliance outlets 54 along the side of the housing contiguous with edge 16c. Otherwise, without the cut-out portion, the power cords would interfere with the opening of the hinged cover 56. Following the same principle, slots 62 are cut into the hinged cover 56 so that cables connected to the signal input connector 13 and signal output connector 15 are not disturbed when the hinged cover 56 is closed.

The anti-tampering function is accomplished by providing a locking mechanism in the cover 56. Many locking mechanisms can be adapted to this invention. For example, a digital code combination, a mechanical combination lock, and a child-proof snap are similarly acceptable. In the preferred embodiment, lock 64 is a two component locking mechanism, each part of which mates to prevent the hinged cover 56 from being opened. The male component 68 of the lock 64 is attached through a hole in the hinged cover 56. The lock 64 is key operated. The key (not pictured) fits into a key hole 72 defined in the lock 64. The lock 64 is engineered so that only the proper key inserted into the key hole 72 will cause the male component 68 of the lock 34 to rotate.

When the hinged cover 56 is closed, the male component 68 of the lock 64 fits into a receiving hole of the female component 70 of the lock 64. Referring to FIG. 2, an aperture in the housing 16 permits access to the female component 70 of the lock 64. The relative position of the male component 68 in the receiving hole of the female component 70 in FIG. 2 is shown in phantom lines.

The female component 70 is engineered so that when rotated by contact and engagement with the male component 68, the lock 64 locks in one direction only. As viewed in FIG. 2, rotation of the male component 68 counterclockwise permits the lock 64 to unlock with the key remaining inserted, while at the farthest allowable extent of counterclockwise rotation. The extent of this rotation is no further than the edges of a faceplate 67 defining an hourglass opening 66 in a manual override means 73, described further below. Reversing the above procedure, i.e. reversing the direction of the rotation to clockwise after reinsertion of the key with the male component rotated to the counterclockwise (vertical) position, locks the cover and the key can be removed.

The exact means by which the male component 68 and the female component cooperate to lock the hinged cover 56 is available from numerous commercially available devices. For example, when the key is moved to a locked position, a tang (not shown) may be caused to engage an open space 69 behind or within the housing 16 (shown as dashed lines in FIG. 1). Alternatively, the tang may be angularly attached to the male component 68 of the lock 64 which fits through the hole in the female component 70 when in the unlocked position; however, when the male component 68 of the lock 64 is turned counterclockwise from the unlocked position, the bar is turned also, thus preventing the male component 68 of the lock 64 from passing back out through the hole in the female component 70.

Also operated by the male member 68 is a manual override means 73 that overrides the function of the timer 10, and instead allows a signal input 12 to reach the television at any time by closing the circuit. The override means 73 is a depressor assembly that mechanically forces the shunt arm 35 of the switch 34 down and into a closed circuit. The override means 73 comprises a faceplate 67 defining an hourglass opening 66 which is rotatably positioned in front of the female component 70 of the lock 64. A fin 74 is attached to the faceplate or other body 67 to project upward above the plane of the shunt arm 35. A small rod 76 is attached perpendicular to the fin 74 and extends towards the rear of the housing 16; the rod 76 passes over the shunt arm 35.

As embodied in FIG. 2, when the fin 74 is positioned vertically, the rod 76 is free of the shunt arm 35, thus allowing the circuit to remain in its normally open state. However, when the male component 68 is turned clockwise past the unlocked position, the normally open switch 34 is disabled by being mechanically closed by the override means 73. This occurs when the male component 68 is caused to rotate clockwise, causing it to contact the faceplate 67, causing the faceplate 67 to rotate clockwise also; thus, the fin 74 and rod 76 rotate also, causing the rod 76 to move across an arc. Across a sufficient arc, the rod 76 contacts with the shunt arm 35 and moves the shunt arm 35 down. The rod 76 forces the shunt arm 35 to move from an open position 36 to a closed position 38. This function can only be performed manually when the proper key is inserted into the key hole 72 and the male component 68 is enabled to turn clockwise.

The hole in the female component 70 is defined to cooperate with the male component 68 so that the switch closes as described above. As the male component 68 of the lock 64 rotates clockwise past the locked position, the male component 68 contacts the surface 80 of the hole in the female component 70 and the female component 70 is also turned clockwise. Clockwise movement of the female component 70 results in closing the switch 34, as described above.

The hourglass opening 66 is shaped so that, when the female component 70 is rotated counter-clockwise by the male component 68, the male component does not come into contact with the faceplate 67, and thus the override means 73 remains stationary and the switch 34 is not affected. Thus, when the lock 64 is being unlocked by turning the male component 68 counter-clockwise the signal to the television is not affected.

Therefore, if the switch 34 is in the open position 36 while the lock 64 is being unlocked, then the switch 34 will remain in the open position 36. In addition, if the switch 34 is in the closed position 38 by virtue of the trip cam while the lock 64 is unlocked, then the switch 34 will also remain in the closed position 38. Thus, the locking function, opening the hinged cover 56, and setting the timer 10 may be performed without affecting the transmission of the signal to the television and the reception of the television.

To recapitulate, when the male component 68 of the lock 64 is inserted into the hourglass opening 66, the male component 68 can have three orientations. When the male component 68 rotates counter-clockwise, the lock 64 is unlocked and the cover 56 may be opened. When the male component 68 rotates clockwise, the timer 10 is in a manual override state. When the male component 68 is in a vertical position, the hinged cover 56 is locked shut.

However, numerous variations to this embodiment exist. In various embodiments the position of the lock, unlock, and manual override functions are reversed, inverted, rotated, or otherwise reoriented. In a simple alternative, the lock 64 is unlocked when the male component 68 is rotated clockwise, and the timer 10 is in manual override when the male component 68 is rotated counter-clockwise by simply changing the orientation of the hole in the female component 70. A designer might also relocate the lock 64 and hole in the female component 70 relative to other components in the invention.

Referring to FIG. 3, the clock face 44 and the set pins 82 are shown concealed with the hinged cover 56 closed. As can now be fully appreciated, when the hinged cover 56 is closed and locked, a person not authorized to access the timer 10 will not be able to tamper with the internal settings of the timer 10. Moreover, the signal input connector 13 and the signal output connector 15 are recessed from the exterior edge 90 of the hinged cover 56; thus, when the hinged cover 56 is closed and locked, a person not authorized to access the timer 10 will not be able to tamper with the signal input connector 13 or the signal output connector 15 either.

The timer can be adapted to operate with more than one signal input 12 and signal output 14. The functional principle illustrated by the embodiment described above would also work with more than one signal input 12 by simply incorporating multiple switches 34 and a trip cam 86 that simultaneously engages and disengages more than one shunt arm 35.

It is to be understood that the present invention is not limited to the embodiment described above, but encompasses any and all embodiments within the scope of the following claims.

I claim:

1. A timing device for blocking an electromagnetic signal comprising:
    a housing having a body and a planar back wall;
    an input terminal for connecting to means external to said housing for carrying an incoming electromagnetic signal;
    an output terminal for connecting to means external to said housing for carrying an outgoing electromagnetic signal to a remote audiovisual device;
    a switch disposed within said housing and operably connected between said input terminal and said output terminal, said switch having an on position forming a closed circuit between said input terminal and said output terminal and having an off position causing an open circuit between said input terminal and said output terminal;
    a clock disposed within said housing for counting time;
    set means for manually setting said clock to a current time and for manually setting at least a first reference time and a second reference time, said set means controlling said switch to change to the on position at said first reference time and to the off position at said second reference time and thereby maintain said closed circuit therebetween;
    a cover pivotally attached to said housing for enclosing said set means, said input terminal and said output terminal;
    locking means for locking said cover to said housing;
    a power plug adapted to engage a standard electrical receptacle, said power plug operably connected to said clock and attached to said back wall of said housing, said back wall further defining an aperture for passage of a screw for threadably engaging a mating aperture of the standard electrical receptacle; and
    an accessory electrical receptacle operably coupled to said power plug.

2. The timing device as defined in claim 1 wherein the switch is selected from the group consisting of a pressure switch, a micro switch, and a solenoid switch.

3. The timing device as defined in claim 1 wherein the set means and clock are chosen from the group consisting of analog and digital devices.

4. The timing device as defined in claim 1 wherein said power plug includes two sets of electrical plugs; and said accessory electrical receptacle includes at least two appliance outlets.

5. The timing device as defined in claim 1 wherein said accessory electrical receptacle is attached to said body of said housing, said cover disposed free of interference with said accessory electrical receptacle while pivotally operated to permit access thereto.

6. The timing device as defined in claim 5 wherein said cover defines a cutout portion about said accessory electrical receptacle.

7. The timing device as defined in claim 1 wherein
    said body of said housing is substantially a box having a front wall opposing said planar back wall,
    said clock includes a rotatable clock face disposed for manual operation externally to said front wall, and
    said set means includes at least two positionable set pins disposed about said clock face for selecting said first reference time and said second reference time, each said set pin selectively fixed about said clock face so as to revolve in a predetermined path with rotation of said clock face.

8. The timing device as defined in claim 7 wherein
    said switch is a mechanical, normally-open switch having a shunt arm, and
    said set pins depend from said clockface into said housing; and further including
    a shaft fixedly disposed within said housing;
    a trip cam rotatably mounted on said shaft, said trip cam configured and dimensioned to engage each set pin as it passes said trip cam on said predetermined path of revolution, to depress said shunt arm to said closed position at said first reference time and to release said shunt arm to said open position at said second reference time.

9. The timing device as defined in claim 8 wherein the set means includes a time reference point located externally to said front wall in a position corresponding to the position of said trip cam within said housing.

10. A timing device for blocking an electromagnetic signal comprising:

a housing having a body and a planar back wall;

an input terminal for connecting to means external to said housing for carrying an incoming electromagnetic signal;

an output terminal for connecting to means external to said housing for carrying an outgoing electromagnetic signal to a remote audiovisual device;

a switch disposed within said housing and operably connected between said input terminal and said output terminal, said switch having an on position forming a closed circuit between said input terminal and said output terminal and having an off position causing an open circuit between said input terminal and said output terminal;

a clock disposed within said housing for counting time;

set means for manually setting said clock to a current time and for manually setting at least a first reference time and a second reference time, said set means controlling said switch to change to the on position at said first reference time and to the off position at said second reference time and thereby maintain said closed circuit therebetween;

a cover pivotally attached to said housing for enclosing said set means, said input terminal and said output terminal;

locking means for locking said cover to said housing;

a power plug adapted to engage a standard electrical receptacle, said power plug operably connected to said clock;

a securing means for securing said housing to the standard electrical receptacle;

an accessory electrical receptacle operably coupled to said power plug; and manual override means for controlling said switch and temporarily maintaining said switch in a closed position.

11. The timing device as defined in claim 10 wherein said override means are operably coupled to the operation of said locking means.

12. The timing device as defined in claim 1 wherein the locking means comprises a lock and a key, said lock comprising a first mating component attached to said cover and a second mating component attached to said housing.

13. The timing device as defined in claim 12 further including manual override means for controlling said switch and maintaining said switch in a closed position, operably coupled to said locking means.

14. The timing device as defined in claim 11 wherein said first mating component rotatably receives said key and includes a male member rotating through its longitudinal axis responsive to rotation of said key, said second mating component receives said male member and locks responsive to rotation of said key;

said switch is a mechanical, normally-open switch having a shunt arm, and said override means comprises a faceplate defining an hourglass opening, said faceplate rotatably positioned to permit said first mating component to pass through said hourglass opening and be received by said second mating component, said faceplate rotating responsive to contact with said male member rotating in a first direction and said face non-responsive and remaining stationary with said male member rotating in a second opposing direction;

a depressor assembly attached to said faceplate disposed proximate said shunt arm for mechanically causing said shunt arm to be depressed from said off position to said on position.

15. The timing device as defined in claim 14 wherein the depressor assembly is a rod attached perpendicular to said fin and said fin is perpendicularly disposed relative to both said male member and said shunt arm so that said rod passes over said shunt arm; and wherein said faceplate when rotated causes said rod to prescribe an arc which crosses said shunt arm, thereby permitting said shunt arm to be depressed to a closed position and released to an open position with opposing rotation of said key with said male member.

* * * * *